United States Patent [19]

Lott

[11] Patent Number: 4,531,743

[45] Date of Patent: Jul. 30, 1985

[54] GOLFER'S AID

[76] Inventor: Thomas M. Lott, 55 W. Santa Inez, San Mateo, Calif. 94022

[21] Appl. No.: 435,907

[22] Filed: Dec. 17, 1983

[51] Int. Cl.³ .............................................. A63B 69/36
[52] U.S. Cl. ................................ 273/183 B; 351/158; 351/45
[58] Field of Search ........... 273/183 B, 183 E, 190 A, 273/54 B, 190 R; 351/200, 203, 52, 51, 57, 58, 59, 158, 45; 128/76.5

[56] References Cited

U.S. PATENT DOCUMENTS

| | | | |
|---|---|---|---|
| 1,637,406 | 8/1927 | Brumder | 273/183 B |
| 3,268,228 | 8/1966 | Novack | 273/183 B |
| 3,487,549 | 1/1970 | Engesser | 273/183 B X |
| 3,555,563 | 1/1971 | Grossman | 273/183 B |

*Primary Examiner*—George J. Marlo
*Attorney, Agent, or Firm*—Robert G. Slick

[57] ABSTRACT

A golfer's aid is provided in the form of a translucent sheet having two transparent crosses thereon wherein the center of the crosses corresponds with the separation of a user's eyes, and a pair of vertical and horizontal slots, respectively, above and at the outer sides of said crosses, said sheet being pivotally supported by extension arms well in front of the user's eyes.

1 Claim, 4 Drawing Figures

GOLFER'S AID

SUMMARY OF THE INVENTION

In the game of golf it is important that the player start with his head in the proper position and with his eyes on the ball. As the golfer swings, it is important that he not raise or lower his head or move his head sidewise. Also, in putting it is important that the player line up the putter club face with the projected path of the ball and also that the player be in proper alignment with the hole in order that the ball follow a path to the hole and not to one side.

Various devices have been proposed in the past but they have suffered from a number of deficiencies. Many of the devices consist of some marking which may be on a lens which is in the same plane as normal glasses and as such it is completely out of focus in the player's eyes and thus does not project a usable indication.

Other devices have been spaced from the user's eyes but they do not provide for both vertical and horizontal alignment but normally provide only single position.

In accordance with the present invention, a golfer's aid is provided which consists primarily of a sheet of translucent material with transparent crosses thereon, each cross being centered at about the pupil of the eye of a wearer. The translucent sheet is supported some distance from the user's face, at least as far as the tip of the nose, so that a sharp image of the cross is projected. When the user looks down at a properly centered ball, the ball appears to be in the center of the cross. If his head is high or low, the ball will be above or below the center. A side movement is indicated by the image of the ball being to the right or left of the center. Also, if the down swing is too fast, the image of the ball will move to the right while a high backswing will move the image to the left.

In addition to being useful in driving, the golfer's aid of the present invention helps greatly in putting. The horizontal lines of the cross are used to line up the face of the putter with the projected path so that the ball will go straight and not at an angle to the putter. In addition, in a preferred embodiment of the invention, horizontal lines are extended to the right and left so that the user cannot only line up the putter correctly, but also can project a channel on the green by rotating his head from the ball to the hole and back again, keeping both the ball and the hole in focus on sharply defined horizontal lines.

The device of the present invention includes ordinary eyeglass frames with extensions on the temples which support the sheet. The sheet can be swung to a horizontal position where it is out of the way or swung to a vertical position for use as a sighting aid.

The device is made of a translucent material while the horizontal and vertical lines thereon are transparent. Since the device is spaced some distance from the user's face, a sharp image of the transparent portion is projected and also one can see the surrounding area through the translucent portion of the device.

DESCRIPTION OF THE PREFERRED EMBODIMENTS

Figure 1:
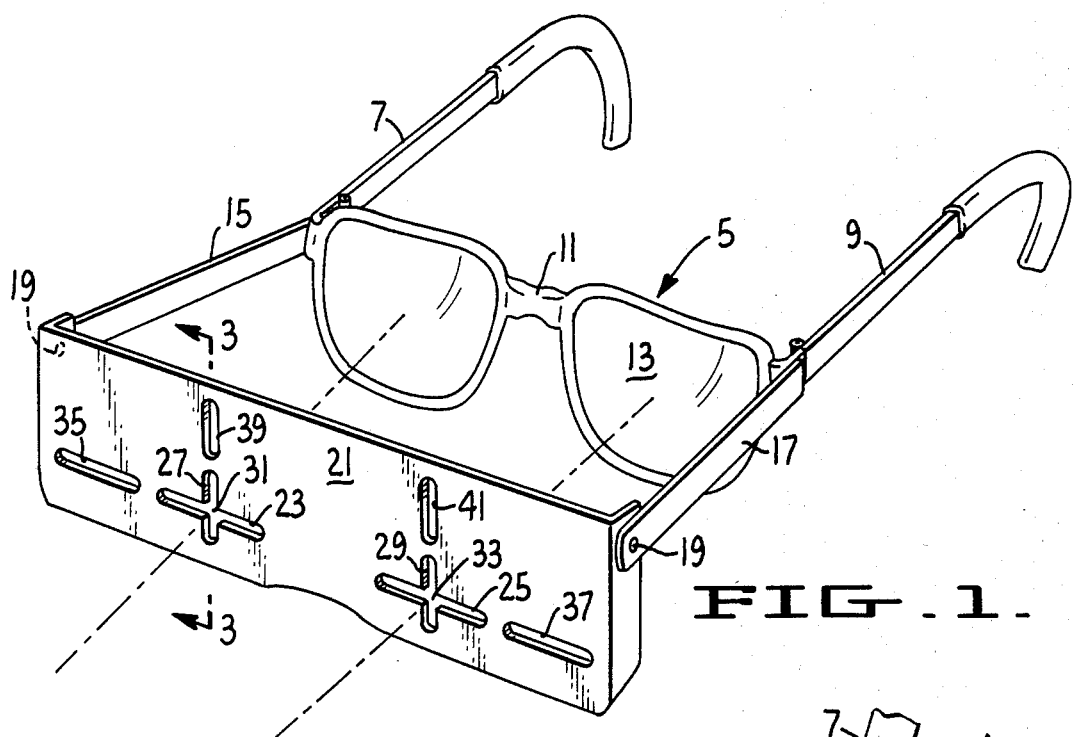
FIG. 1 is a perspective view of a device embodying the present invention.

Referring now to the drawings by reference characters, the device of the present invention is supported eyeglass frames 5 of the ordinary configuration having temples 7 and 9 at each side of the frame which extend back and hook over the ears. The glasses have the usual nosepiece 11 which engages the nose of a wearer close to the wearer's face. The glasses may have lenses 13 and these may be prescription glasses, colored glasses or the glass may be omitted entirely, the frame serving only to support the golfer's aid.

Each of the temples has extension arms 15 and 17 extending forward of the user's face and terminating at pivot points 19 which are spaced an inch or so beyond the user's face, normally at about the tip of the user's nose.

Figure 3:
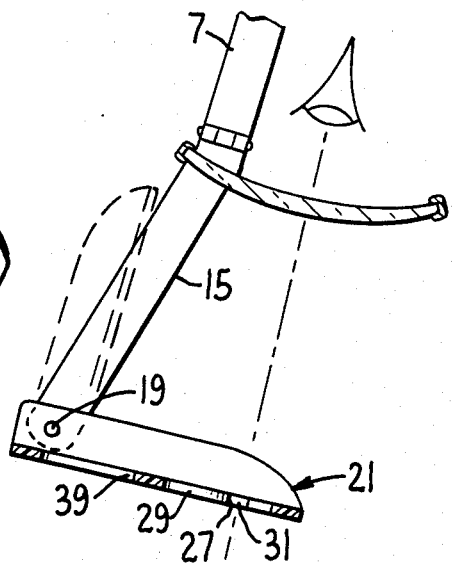
FIG. 3 is a fragmentary view, partly in section, from the side of the device.
Figure 4:
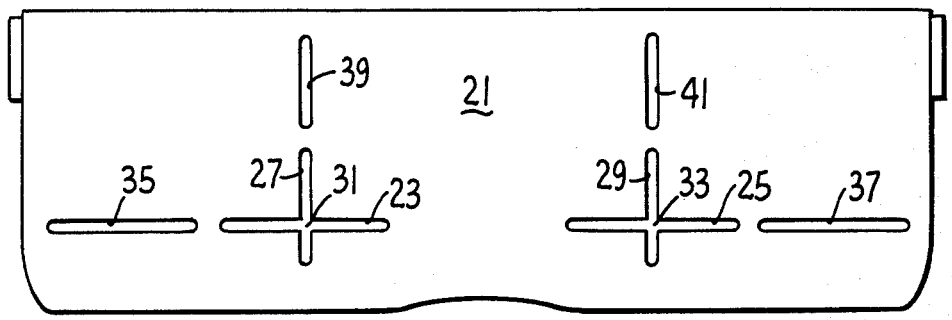
FIG. 4 is a view of the sighting aid proper.

The sighting aid proper is designated 21 and it is ordinarily made of a translucent material such as colored plastic. It is pivoted at the points 19 so that it can be brought down in front of the face of the user as is shown in solid lines in FIG. 3 or brought up, as is shown in phantom in horizontal position, so that it will be out of the way. The sighting aid 19 is shown swung to the rear in FIG. 3, although it might be swung to the front. Spring means might be employed with detents to hold the aid in either of two selected positions but normally it is sufficient merely to have friction between extension arms and aid so that it will stay where placed. The sighting aid has transparent portions preferably made by cutting out the translucent plastic. These consist of horizontal lines 23 and 25 and the vertical lines 27 and 29 which cross at the points 31 and 33 at the interpupillary distance of a wearer. In addition, the aid may optionally have second horizontal lines 35 and 37 at opposite sides of the cross lines and also may have additional vertical lines 39 and 41 forming extensions of the lines 27 and 29, respectively.

When the device is used by one of ordinary binocular vision, the center points of the crosses 31 and 33 fuse so that only a single cross is seen having a horizontal component 43 which results in the fusion of lines 23 and 25 and a vertical component 45 resulting from the fusion of lines 27 and 29. Lines 35 and 37 do not fuse but appear to be on each side of the fused cross. The resultant picture is shown in FIG. 2.

Figure 2:
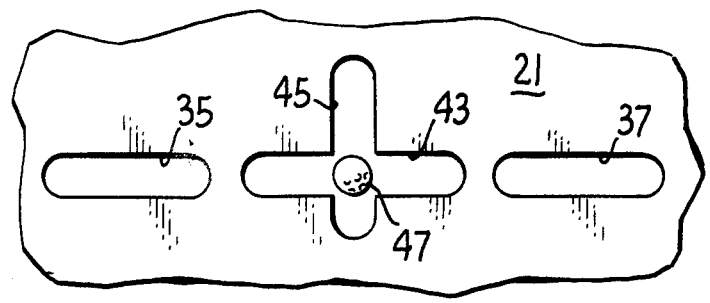
FIG. 2 is an enlarged view of what the user sees as he sights through the device with the two crosses fused.

When the ball is properly centered, the image is shown as it appears in FIG. 2 with the ball 47 centered at the crossing of the fused cross. As one swings at the ball, the image of the ball should remain at the center of the cross. A low image results from raising the head, twisting of the body or too high a backswing. A high ball image results from lowering the head. An image to the right results from too fast a downswing or side head movement. An image to the left results from high backswing or moving head to side. Thus, the device of the present invention is very helpful in properly centering the ball and in driving.

The device of the present invention is very valuable in putting. In putting one centers the ball as is shown in FIG. 2 and then uses a horizontal line to line up the putter club face with the projected path of the ball. Further, by glancing from one side or the other utilizing the transparent lines 35 or 37 (depending on whether the user is right or left handed), one can project a channel of the ball to the hole and thus get the proper angle. The vertical lines 39 and 41 can also be used to line up the ball under certain conditions.

The crux of the present invention is to employ the crosses centered at 31 and 33 on a translucent visor which can be supported at some distance from the face of the wearer. The additional transparent lines 35, 37, 39 and 41 can be eliminated, although they are useful under many conditions.

Many departures can be made from the exact structure shown.

I claim:

1. A golfer's aid comprising in combination:
   (a) spectacles having a frame including temple members at each side of the frame for engaging the ears of a wearer and a nosepiece adapted to engage the nose of a wearer near the wearer's face,
   (b) extension arms forming extensions of each of said temple members and terminating beyond said nosepiece,
   (c) a sighting aid supported at the terminal ends of said extension arms,
   (d) pivoted mounting means for supporting said sighting aid whereby said aid can be swung to either a horizontal or vertical position,
   (e) said sighting aid comprising a sheet of translucent material with a first pair of transparent horizontal lines and a first pair of transparent vertical lines, each pair crossing at points centered on the eyes of a wearer,
   (f) said sighting aid having two additional transparent horizontal lines located at each side of said first horizontal lines, and
   (g) said sighting aid having two additional transparent vertical lines, one located above each of the first vertical lines.

* * * * *